C. E. WHITE.
SIDE DELIVERY HAY RAKE.
APPLICATION FILED AUG. 17, 1908.
1,055,846.
Patented Mar. 11, 1913.
2 SHEETS—SHEET 1.
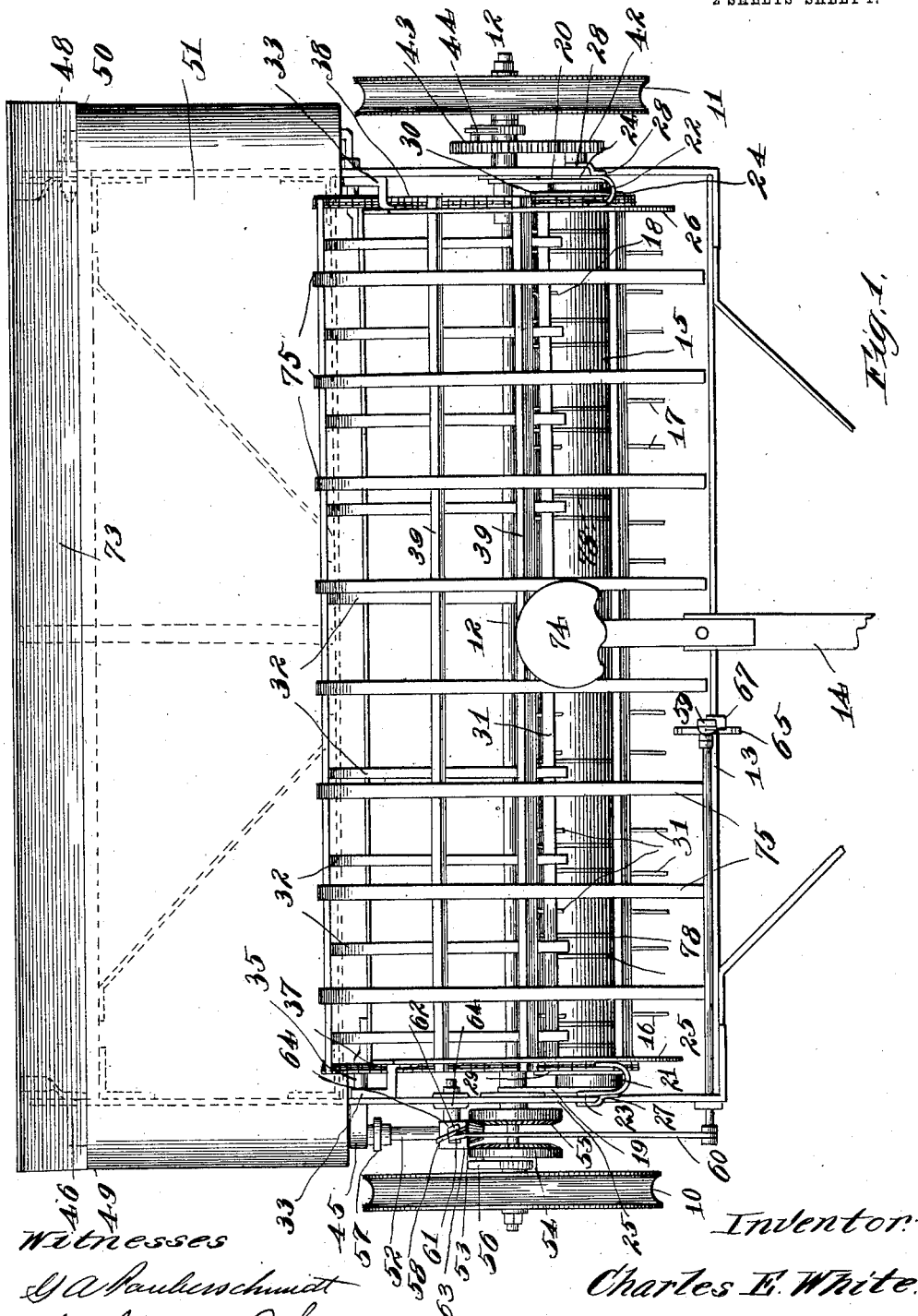
Witnesses
G A Faubenschmidt
Hilda J. Arbeen
Inventor
Charles E. White.
By
Gilkey & Gilkey C. E. WHITE.
SIDE DELIVERY HAY RAKE.
APPLICATION FILED AUG. 17, 1908.
1,055,846.
Patented Mar. 11, 1913.
2 SHEETS—SHEET 2.
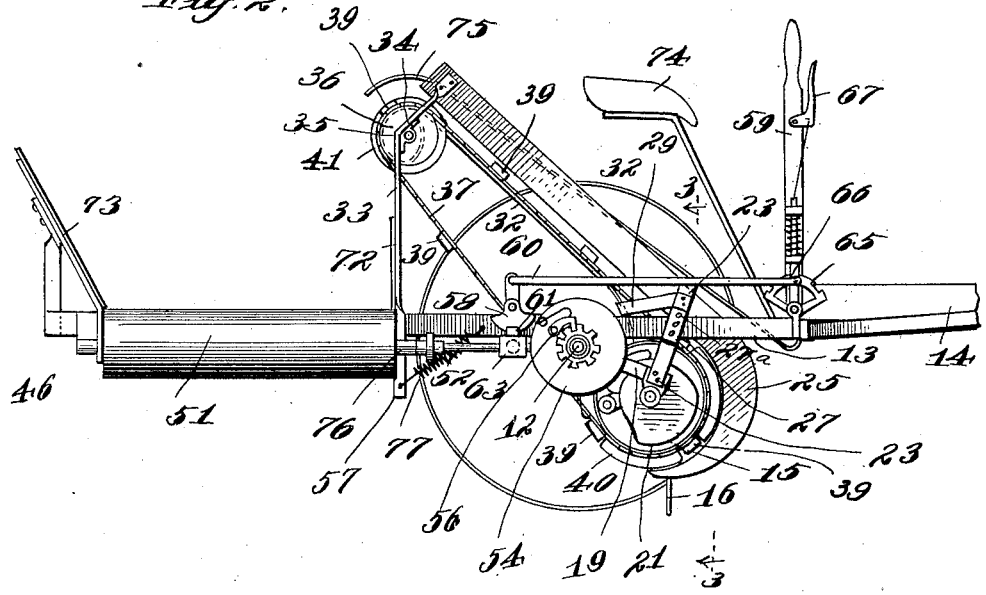
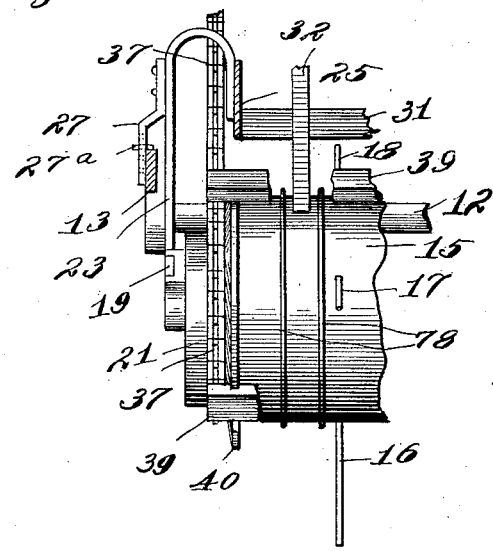

UNITED STATES PATENT OFFICE.

CHARLES E. WHITE, OF MOLINE, ILLINOIS.

SIDE-DELIVERY HAY-RAKE.

1,055,846.   Specification of Letters Patent.   Patented Mar. 11, 1913.

Application filed August 17, 1908. Serial No. 448,920.

*To all whom it may concern:*

Be it known that I, CHARLES E. WHITE, a citizen of the United States, and resident of Moline, county of Rock Island, and State of Illinois, have invented certain new and useful Improvements in Side-Delivery Hay-Rakes, of which the following is a specification, and which are illustrated in the accompanying drawings, forming a part thereof.

The invention relates to rakes especially adapted to collect the hay into windrows; and it consists of a structure such as is hereinafter described and as illustrated in the accompanying drawings, in which—

Figure 1 is a plan view of the machine; Fig. 2 is a side elevation of the same; Fig. 3 is a detail, partly in section, showing the raking drum and the manner of mounting the same, and taken on the line 3—3 of Fig. 2; and Fig. 4 is a sectional detail of an apron-carrying roll, and showing its support.

The machine is carried on a pair of traction wheels 10, 11, mounted on an axle 12 and supporting a frame 13 to which the draft-pole 14 is attached.

The gathering or raking device is in the form of a drum or cylinder 15, having sets of raking teeth 16, 17, 18. This drum may be of any desired construction, and is not, therefore, shown in detail in this application, though the drawings represent the raking drum or cylinder which forms the subject of a copending application for Letters Patent of Charles E. and Charles H. White.

The raking drum 15 is located forward of the axle 12, and is journaled in a pair of arms 19, 20, which oscillate about the axle 12 and carry cams 21, 22, for controlling the teeth 16, 17, 18. A pair of arms 23, 24, are pivoted to and rise from the arms 19, 20, and carry the lower ends of a pair of sideboards 25, 26, to which they are pivoted. To each of the arms 23, 24, is attached a stop-arm 27, 28, projecting outwardly over the side members of the frame 13 and limiting the downward movement of the raking drum, a stud 27ª adjustably fixed in the stop arm engaging the top of the side member 13 of the carrying frame. A pair of bars 29, 30, extend backwardly from the arms 23, 24, and support a cross-bar 31, from which project upwardly a series of slats 32 forming a deck over which the hay is elevated.

A pair of uprights, one, 33, only of which is plainly shown, rises from the side members of the frame 13 back of the axle and carry boxes 34 within which is journaled a shaft 35, carrying a pair of sprocket wheels 36, over which turn a pair of chains 37, 38, which run on and are driven from the drum 15. The chains 37, 38, carry a plurality of slats 39 which engage notches in upstanding rims 40, 41, formed on the drum and the wheels 36, 37, and constitute sprocket wheels for driving the carrier thus formed of the chains and slats 39.

The drum 15 is circumferentially ribbed as shown at 78, the ribs being arranged to form channels to receive the lower ends of the deck slats 32, thereby providing more effectively for the transfer of the hay from the gathering to the elevating mechanism.

The drum 15 is driven by a pair of gears, one thereof, 42, being mounted on the drum shaft and the other, 43, on the axle 12. The traction wheels 10, 11, are loosely mounted on the axle 12, and one thereof is connected with the wheel 43 by a ratchet and pawl mechanism, shown at 44, and being of any desired form of construction.

Journaled at each side of the frame 13 and adjacent its rearward end, in suitable brackets 45, 46, 47, 48, are a pair of rollers 49, 50, upon which runs an endless apron 51. This apron is driven by means of a shaft 52, constituting a continuation of the shaft of one of the rollers, as 49, and carrying at its forward end a bevel gear 53, adapted to mesh in alternation with a pair of bevel gears 54, 55, carried by the axle 12, and connected, by means of suitable ratchet and pawl mechanism 56, with one of the traction wheels 10. The shaft 52 is flexible, being provided with any suitable form of universal joint conventionally shown at 57, and is controlled by means of a cam 58, pivotally mounted on the side member of the frame 13 and actuated by a hand lever 59, pivoted upon the forward end of the frame 13, and connected with the cam by means of a link-rod 60.

The cam 58 engages a pair of lugs 61, 62, carried by a box 63 encircling the shaft 52 and slidable upon a bracket-arm 64 projecting laterally from the side of the frame 13. The oscillation of the cam 58 causes the reciprocation of the box 63 and the lateral movement of the shaft 52 to engage the gear 53 with either the gear 54 or 55, as may be desired. The lever-arm 59 coöperates with a notched quadrant 65 through the medium of a spring-advanced pawl 66 and latch lever 67.

The roller 50 is preferably adjustable for the purpose of tightening the apron 51, and a convenient method of mounting such roller for this purpose is illustrated in Fig. 4, the roller being journaled on stud-shafts 68, each of which is carried by a bracket-rod 69 set through the side member of the frame 13 and adjustably fixed therein by means of a pair of nuts 70, 71.

Side-boards 72, 73, are located one at each side of the apron 51. A seat 74 for the operator is supported on the front end of the frame 13, and a series of wind slats 75 project upwardly from the forward end of this frame to the upper end of the deck, their upper ends being supported by a cross-bar carried by the upwardly-projecting ends of the side-boards 25, 26.

As the machine is driven forward the raking drum 15 is turned in the reverse direction to that of the rotation of the traction wheels. The hay gathered by the teeth 16, 17, 18, is carried upwardly under the wind slats 75, and onto the deck-slats 32, and is then moved upwardly over the deck by the slats 39 of the carrier and discharged upon the apron 51, and thence delivered at one side of the machine in a windrow. The delivery may be made at either side of the machine, as desired, the direction of the travel of the apron 51 being determined by the position of the gear 53. The raking teeth are flexible, as is usual in making implements, and may, if desired, be so mounted as to yield to positive obstructions. As a further precaution against injury to the machine, the entire raking mechanism swings about the axle of the carrying wheels, and when the raking drum encounters a positive obstruction too large to be escaped by the yielding teeth, the drum and its appurtenances rise over it, the arms 19, 20, swinging upon the axle 12.

To permit of the free oscillation of the raking mechanism the uprights 33 are pivoted to the frame 13 as shown at 76, and a spring 77 reacting between the lower end of each and the side of the frame tends to swing them backward and thus hold taut chains 37, 38.

The machine is approximately balanced upon the carrying axle by reason of the location of the raking drum forward thereof, while the delivery apron is to the rearward. The weight of the operator adds the necessary extra weight to prevent the implement from tilting backwardly without, however, requiring the use of a forward truck. The construction is, therefore, such that only a single pair of carrying wheels becomes necessary, and the implement is cheap of construction, light of draft, and easy of manipulation.

I claim as my invention—

1. In a raking machine, in combination, a wheel supported frame, a gathering device carried by the frame and having a vertical movement, a swinging support rising from the frame, and elevating mechanism carried by the swinging support and the gathering device.

2. In a raking machine, in combination, a wheel supported frame, swinging arms carried by the frame forward of the wheels, a raking cylinder carried by the arms, a pair of swinging arms rising from the frame back of the wheels, wheels carried by the last named arms, chains running over such wheels and the cylinder, and means for urging the wheel carrying arms in a direction to tighten the chains.

3. In a raking machine, in combination, a wheel supported frame, swinging arms carried by the frame forward of the wheels, a raking cylinder carried by the arms, a pair of swinging arms rising from the frame back of the wheels, wheels carried by the last named arms, chains running over such wheels and the cylinder, and springs reacting between the wheel carrying arms and the frame and urging the arms backwardly.

4. In a hay raking machine, in combination, a rotatable cylinder having gathering teeth, the periphery of the cylinder being ribbed, and a deck rising from the cylinder and comprising slats, the lower ends of which lie between ribs of the cylinder.

CHARLES E. WHITE.

Witnesses:
 WM. B. SAMUEL,
 THOS. V. MAGUIRE.

---

Copies of this patent may be obtained for five cents each, by addressing the "Commissioner of Patents, Washington, D. C."